(12) United States Patent
Hecht et al.

(10) Patent No.: US 9,805,259 B2
(45) Date of Patent: Oct. 31, 2017

(54) METHOD FOR PROVIDING MEASUREMENT DATA FROM A DEVICE FOR PROCESSING VALUE DOCUMENTS AND VALUE DOCUMENT PROCESSING DEVICE

(71) Applicant: GIESECKE & DEVRIENT GMBH, Munich (DE)

(72) Inventors: Matthias Hecht, Neubiberg (DE);
Klaus Vrana, Neufahrn (DE);
Karl-Dieter Forster, Deisenhofen (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 262 days.

(21) Appl. No.: 14/649,074

(22) PCT Filed: Dec. 11, 2013

(86) PCT No.: PCT/EP2013/003744
§ 371 (c)(1),
(2) Date: Jun. 2, 2015

(87) PCT Pub. No.: WO2014/090402
PCT Pub. Date: Jun. 19, 2014

(65) Prior Publication Data
US 2015/0302248 A1    Oct. 22, 2015

(30) Foreign Application Priority Data
Dec. 13, 2012 (DE) .................. 10 2012 024 390

(51) Int. Cl.
*G07D 7/00* (2016.01)
*G06K 9/00* (2006.01)
(Continued)

(52) U.S. Cl.
CPC ......... *G06K 9/00469* (2013.01); *G05B 15/02* (2013.01); *G06K 9/00456* (2013.01);
(Continued)

(58) Field of Classification Search
CPC ........... G06K 9/00469; G06K 9/00456; G06Q 40/02; G05B 15/02; G07D 7/00; G07D 7/12
See application file for complete search history.

(56) References Cited

U.S. PATENT DOCUMENTS

| 4,040,027 | A | * | 8/1977 | van Es | ................... G06F 5/12 710/57 |
| 6,074,081 | A | | 6/2000 | Smith et al. | |

(Continued)

FOREIGN PATENT DOCUMENTS

| DE | 19618541 A1 | 11/1996 |
| DE | 10037177 A1 | 2/2002 |

(Continued)

OTHER PUBLICATIONS

Birla, Manish Kumar, "FPGA Based Reconfigurable Platform for Complex Image Processing", 2006 IEEE International Conference on Electro/Information Technology, May 7-10, 2006, pp. 204-209.

(Continued)

*Primary Examiner* — Mark Beauchaine
(74) *Attorney, Agent, or Firm* — Workman Nydegger

(57) ABSTRACT

A method for making available measuring data of a value-document processing apparatus for processing value documents includes feeding individual value documents in real time, measuring data for the value documents are captured by means of a sensor device and stored in an intermediate memory, such that feeding of individual value documents and/or the capturing of measuring data the current utilization of the intermediate memory is compared to a predetermined (Continued)

limit utilization, dependent on the comparison. The feeding of value documents is interrupted and measuring data from the intermediate memory are permanently stored in a permanent memory, and during the permanent storing and/or after the permanent storing of the measuring data in the permanent memory the intermediate memory is released again. After release of the intermediate memory the feeding of individual value documents and capturing and storing of measuring data for the fed value documents in the intermediate memory is restarted.

9 Claims, 1 Drawing Sheet

(51) Int. Cl.
  *G05B 15/02* (2006.01)
  *G06Q 40/02* (2012.01)
  *G07D 7/12* (2016.01)

(52) U.S. Cl.
  CPC ............... *G06Q 40/02* (2013.01); *G07D 7/00* (2013.01); *G07D 7/12* (2013.01)

(56) References Cited

U.S. PATENT DOCUMENTS

| | | |
|---|---|---|
| 6,151,534 A | 11/2000 | Smith et al. |
| 7,788,633 B2 | 8/2010 | Kersten et al. |
| 2002/0026422 A1 | 2/2002 | Kersten et al. |
| 2004/0031931 A1 | 2/2004 | Muller et al. |
| 2013/0251235 A1* | 9/2013 | Lax .................... G06Q 40/02 382/138 |
| 2014/0147030 A1 | 5/2014 | Rohrl et al. |

FOREIGN PATENT DOCUMENTS

| | | |
|---|---|---|
| DE | 10242572 A1 | 4/2004 |
| DE | 102010046024 A1 | 3/2012 |
| EP | 0280436 A2 | 8/1988 |
| EP | 1418549 A1 | 5/2004 |

OTHER PUBLICATIONS

Waldo, Sten et al., "Fifo-Speicher Richtig Angewendet", Elektronik 17/23 8, 1985, pp. 63-69.
German Search Report from corresponding DE Application No. 10 2012 024 390.1, dated Jun. 28, 2013, (8 pages).
International Search Report from corresponding PCT Application No. PCT/EP2013/003744, dated Mar. 4, 2014, (2 pages).
International Preliminary Report on Patentability from corresponding PCT Application No. PCT/EP2013/003744, dated Jun. 16, 2015, (7 pages).

\* cited by examiner

METHOD FOR PROVIDING MEASUREMENT DATA FROM A DEVICE FOR PROCESSING VALUE DOCUMENTS AND VALUE DOCUMENT PROCESSING DEVICE

BACKGROUND

The present invention relates to a method for making available measuring data of an apparatus for processing value documents of predetermined different processing types, and a value-document processing apparatus for carrying out the method. Preferably, the measuring data made available can be usable for adapting parameters of the apparatus.

Value documents are understood in this connection to be sheet-shaped objects that represent for example a monetary value and hence should not be producible arbitrarily by unauthorized persons. Hence, they have features that are not easily produced, in particular copied, whose presence is an indication of authenticity, i.e. production by an authorized body. Important examples for such value documents are vouchers, checks and in particular banknotes.

Value-document processing apparatus, in particular banknote processing apparatus, classify value documents, in particular banknotes, with regard to the value document type, in the case of banknotes the currency and/or the value, and/or the authenticity and/or the quality and/or the orientation. The orientation of a value document is understood hereinafter to mean in a rectangular value document any of the four possible positions which can be obtained by rotations of the value documents about its longitudinal axis and transverse axis by 180° in each case. The quality of a value document is understood to mean in particular its state; in banknotes, the state can be given in particular by classes such as "fit for circulation" and/or "unfit for circulation" and/or "damaged" or "damaged" in connection with the type of the damage. In dependence on the classification, the value documents can then for example be sorted and possibly be deposited in corresponding output areas. This is explained using the example of value documents in the form of banknotes.

The classification is effected on the basis of different physical properties of the individual, i.e. respectively processed, banknote. Examples for such physical properties are optical properties, in particular color properties, magnetic properties or ultrasound properties.

During the processing of banknotes in banknote processing apparatus, measuring data are produced by means of sensors on the basis of different physical properties of the individual, i.e. respectively processed, banknote, which measuring data are employed for the classification. Measuring data are understood hereinafter to mean generally raw data formed by a sensor, which raw data are unprocessed apart from processing operations in the sensor and/or corrections, in particular also with reference to calibration, elimination of noise or background components. Additionally, the measuring data can also comprise properties of the banknotes computed in real time from the measuring data, for example average values or other statistical properties at least of a part of the measuring data.

The measuring data delivered by the sensors are evaluated in a connected evaluation device. In this evaluation, banknote features characterizing the banknote type, the authenticity and the quality of the banknote, are determined by suitable evaluation methods. In dependence on the determined banknote features a classification result is computed by the evaluation device, the classification result subsequently determining in which output pocket of the banknote processing apparatus the banknote is to be deposited.

The evaluation methods and the ascertainment of the classification result must be adapted to the type of banknotes to be processed and also to the requirements of the operators of banknote processing apparatus. For this purpose, the evaluation device, preferably an evaluation program running therein, is parameterizable, i.e. classification parameters are present the values of which can be predetermined and which are employed in the evaluation and classification and/or the ascertainment of the classification result; this adaptation of the classification parameter values, also referred to as adaptation of the classification parameters, will hereinafter be referred to as adaption.

In order to ascertain appropriate classification parameters, generally the measuring data of corresponding, suitably predetermined banknotes are employed for the adaptation of classification parameters. More exactly, in a first step, in a recording of measuring data for the predetermined banknotes with the banknote processing apparatus, corresponding measuring data are captured and stored. These measuring data are then utilized in a second step to ascertain the classification parameter values.

In order to make possible a good parameterization, upon recording measuring data, measuring data are frequently captured for a larger number of banknotes which differ with regard to different processing properties, for example their type, in particular currency and/or value, their quality or state, their authenticity and/or the orientation in which they are transported past the sensors in the value-document processing apparatus.

For the subsequent ascertainment of parameters it is then required that the measuring data for the different processing properties can be accessed in targeted fashion. The measuring data thus must be stored in correspondingly different data structures, e.g. files. Additionally, the information must be available for which banknote the measuring data were ascertained.

However, when larger numbers of banknotes are involved, the capturing of measuring data can be made difficult for example by modern optical sensors capturing images at a high resolution, for the transmission and storage of which high data transmission speeds are required. However, such data transmission speeds are required during normal operation only between the sensors and the evaluation device.

SUMMARY

It is therefore the object of the present invention to specify a method for making available measuring data of a value-document processing apparatus for processing value documents which requires only simple means for being carried out also when larger numbers of value documents and/or high-resolution optical sensors are involved, and to make available means for carrying out the method. Preferably, the measuring data are usable for adapting parameters of the value-document processing apparatus.

The object is achieved by a method for making available measuring data of a value-document processing apparatus for processing value documents, having a feeding apparatus for feeding individual value documents and a sensor device with an intermediate memory, having one or several sensors for capturing at least one physical property of fed individual value documents and being configured to store in real time in the intermediate memory measuring data for the individual value documents produced by means of the one sensor or the several sensors; in the method individual value documents are fed by means of the feeding device and measuring data are captured by means of the sensor device and stored in real time in the intermediate memory, wherein, during the feeding of individual value documents and/or the capturing of measuring data a criterion is monitored that the current utilization of the intermediate memory exceeds a predetermined limit utilization. Further, in the method, when the criterion is fulfilled, the feeding of value documents is interrupted and measuring data from the intermediate memory are stored permanently in a permanent memory; in the method the intermediate memory is released again during the permanent storing and/or after the permanent storing of the measuring data in the permanent memory, and after the release of the intermediate memory the feeding of individual value documents and the capturing and storing in the intermediate memory of measuring data for the fed value documents is restarted.

After interrupting the feeding and before the permanent storing of the measuring data, preferably also the capturing and/or storing of measuring data is/are interrupted.

The object is further achieved by an apparatus for processing value documents, having a feeding device for feeding individual value documents, a receiving device for receiving processed value documents, a transport device for transporting individual value documents from the feeding device along a transport path to the receiving device and a sensor device with an intermediate memory, having one or several sensors for capturing respectively at least one physical property of fed individual value documents transported along the transport path, and being configured to store in real time in the intermediate memory measuring data for the value documents produced by means of the one sensor or several sensors. The sensor device can be set to a measuring mode of operation, in which measuring data for individual value documents are captured by means of the one or several sensors and stored in real time in the intermediate memory, and a criterion is monitored that the current utilization of the intermediate memory exceeds a predetermined limit utilization, and to a rest mode of operation, in which no measuring data are stored. Further, the value-document processing apparatus comprises a permanent memory for permanently storing measuring data and/or an interface for an external permanent memory for permanently storing measuring data. The apparatus is further configured, when the sensor device is in the measuring mode of operation, when the criterion is fulfilled, to so drive the feeding device that the former does not feed any further individual value documents, to set the sensor device to the rest mode of operation and to permanently store the measuring data from the intermediate memory in the permanent memory or external permanent memory, and to release the intermediate memory again during the storing or after the storing, and after releasing the intermediate memory to so drive the feeding device that the former restarts the feeding of individual value documents, and to set the sensor device to the measuring mode of operation.

The feeding device serves for feeding the value documents, which feeding device can comprise a singler in particular, which singles value documents of a stack of value documents and feeds them to the transport device, so that these can be transported further consecutively as individual value documents.

It is now provided that at least one physical property of the singled or individual value documents is captured in real time, i.e. during the feeding of value documents. For this purpose the sensor device has one or several or at least one corresponding sensor at the transport path. Upon capturing, the one or the several sensor(s) produce sensor signals that reproduce the physical property at least indirectly and from which the sensor device produces the measuring data. The production can take place in real time in the sensors or by means of a different device of the sensor device.

The measuring data are now stored in real time, preferably in timing with the feeding of individual value documents, in the intermediate memory, which has sufficiently fast data connections to the one or several sensors or a device processing the sensor signals. The intermediate memory can be configured as a volatile memory in particular.

In order to prevent an overflow of the intermediate memory, during the feeding of individual value documents and/or the capturing of measuring data, now the criterion is monitored that the current utilization of the intermediate memory exceeds a predetermined limit utilization, in order to recognize when the intermediate memory would overflow upon unchanged operation. The utilization can be stated as a proportion of the currently occupied memory of the memory that is maximally available for storing the measuring data or also absolutely. The limit utilization must then be predetermined correspondingly. The criterion can preferably comprise a comparison of the current utilization of the intermediate memory occupied by measuring data to the predetermined limit utilization. However, it is also possible that the criterion comprises only the number of the value documents singled and/or captured since the last start of singling and a predetermined maximum number. This type of criterion is particularly advantageous when it has to be expected that for all predetermined value documents measuring data will occur and will have to be stored in the intermediate memory, which have at least similar memory space requirements.

When the criterion is fulfilled, for example in dependence on the comparison, preferably when it is recognized that the limit utilization is exceeded, the feeding of value documents is interrupted, which can be effected by directly or indirectly driving the feeding device. Further, the measuring data from the intermediate memory are stored in the permanent memory. Permanent storage is understood here as a storage which remains for a period of time that is substantially longer than the period of time for the capturing of measuring data for the complete stack of value documents and/or is continued also when the value-document processing apparatus is switched off. The permanent memory can be in particular a mass memory such as for example a hard disk.

During or after the storing of the measuring data from the intermediate memory in the permanent memory, the intermediate memory is released again, and is thus available for storing measuring data for data to be captured subsequently of further individual value documents. Therefore the feeding of value documents and the capturing of the at least one physical property, and thereby the production and storing of measuring data in the intermediate memory is restarted then.

By this way of proceeding, it is possible to ensure a continuous data transmission of all measuring data to the permanent memory, also when the speed of the data transport from the intermediate memory to the permanent memory is much lower than that of the data transport from the sensors to the intermediate memory. By the automatic interruptions of the feeding of individual value documents, a quasi-continuous data recording of very large amounts of measuring data is possible.

According to one embodiment, the permanent memory can form part of the value-document processing apparatus.

The former can then in particular also have a simple data-processing device, for example an industrial PC, which collects the data from the intermediate memory or receives them and stores them to or in the permanent memory.

However, alternatively or additionally it is also possible that the value-document processing device has an interface for the data transmission to the permanent memory and the permanent memory is set off from the value-document processing apparatus. The interface can be an interface for an external storage medium, for example a USB or firewire interface, or a network interface, for example a LAN card or the like. Also in this case, the apparatus can also have a simple data processing device, for example an industrial PC, which collects the data from the intermediate memory or receives them and transmits them via the data interface to the external permanent memory that is connected via the former.

In the apparatus, the sensor device can be set to at least two different modes of operation. In the rest mode of operation, at least no measuring data are stored in the intermediate memory, preferably also the capturing of the at least one physical property and the production of the measuring data are switched off. In the method, preferably after interrupting the feeding and before the permanent storing of the measuring data, also the capturing and/or storing of measuring data is interrupted. In the measuring mode of operation, in contrast, measuring data are captured for individual value documents or preferably produced from sensor signals of the sensors, and stored in the intermediate memory, and the current utilization of the intermediate memory is compared to a predetermined limit utilization. The switching to the measuring mode of operation thus leads to the result that measuring data can be captured in real time.

Further, it is preferred in the method that after interrupting the feeding, it is checked whether no individual value document is disposed any longer along the transport path between the feeding device and the sensor device, and the interruption of the capturing and storing of the measuring data is effected only when no fed value document is disposed any longer between the feeding device and the sensor device. The apparatus can then be configured for this purpose.

Preferably, the apparatus has a machine control for controlling the feeding device and the transport device in real time. The sensor device then preferably comprises an evaluation device which evaluates the measuring data and sends control signals to the machine control in dependence on the evaluation result; the sensor device, preferably the evaluation device, can then drive the machine control for interrupting the feeding of the value documents using an interruption signal, with the machine control then so driving the feeding device that no value documents are fed any longer. This embodiment permits a particularly high processing speed, since both the sensor device and the machine control are configured for operation in real time.

In this case, the machine control can preferably check after receipt of the interruption signal whether no individual value document is disposed any longer along the transport path between the feeding device and the sensor device, and preferably, the check has had the result that no individual value document is disposed any longer along the transport path between the feeding device and the sensor device, emits a signal to the sensor device, in response to which the sensor device is set to the rest mode of operation. In this fashion it can be largely ensured that measuring data are obtained for all individually fed value documents.

BRIEF DESCRIPTION OF THE DRAWINGS

The invention will hereinafter be explained further by way of example with reference to the drawings. The figures are described as follows.

DETAILED DESCRIPTION OF VARIOUS EMBODIMENTS

Figure 1:
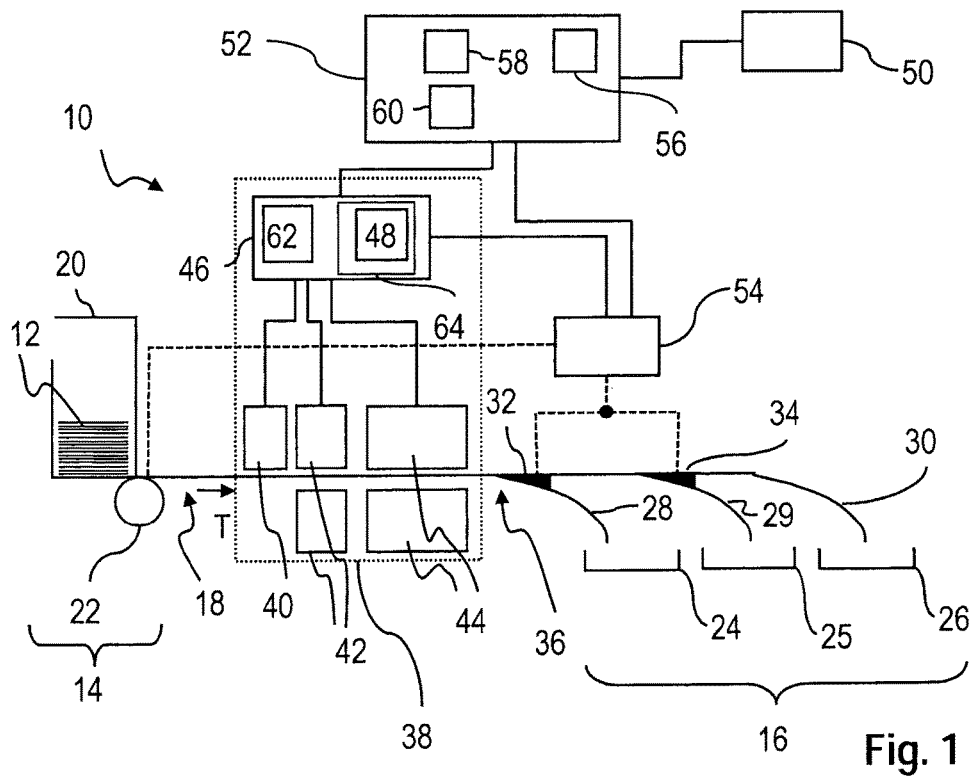
FIG. 1 a schematic view of a value document sorting apparatus.

A value-document processing apparatus 10 in FIG. 1, in the example an apparatus for processing value documents 12 in the form of banknotes, is configured to sort value documents in dependence on the recognition of the authenticity and the state of processed value documents. The components of the apparatus described in the following are arranged in or held on a not shown housing of the apparatus, unless designated as external.

The apparatus has a feeding device 14 for feeding value documents, an output device 16 for receiving processed, i.e. sorted, value documents, and a transport device 18 for transporting singled value documents from the feeding device 14 to the output device 16.

The feeding device 14 in the example comprises an input pocket 20 for a value document stack and a singler 22 for singling value documents of the value document stack in the input pocket 20 and for feeding the singled or individual value documents to the transport device 18.

The output device 16 in the example comprises three output sections 24, 25 and 26, into which the processed value documents can be sorted according to the processing result. In the example each of the sections comprises a stack pocket and a not shown stacking wheel, by means of which fed value documents can be deposited in the respective stack pocket.

The transport device 18 has at least two, in the example three branches 28, 29, and 30, at the ends of which there is arranged respectively one of the output sections 24 or 25 or 26, and at the branches has gates 32 and 34 controllable by actuating signals, by means of which value documents can be fed to the branches 28 to 30 and thus to the output sections 24 to 26 in dependence on actuating signals.

On a transport path 36 defined by the transport device 18, between the feeding device 14, in the example more exactly the singler 22, and the first gate 32 after the singler 22 in the transport direction, there are arranged sensors of a sensor device 38 described in more detail hereinafter, which sensor device measures, while value documents are transported past, physical properties of the value documents and forms sensor signals reproducing the results of the measuring. In this example the sensor device 38 has three sensors, namely an optical reflectance sensor 40 capturing a reflectance color image and a reflectance IR image of the value document, an optical transmission sensor 42 capturing a transmission color image and a transmission IR image of the value document, and a transmission ultrasound sensor 44 capturing or measuring in spatially resolved fashion ultrasound transmission properties of the value document, the former being referred to hereinafter only as ultrasound sensor for the sake of simplicity. As physical properties thus the reflectance and transmission in the mentioned wavelength ranges are captured, as well as the ultrasound transmission in spatially resolved fashion. The sensor signals formed by the sensors correspond to measuring results or raw data of the sensors which, depending on the sensor, can already have been subjected to correction, for example in dependence on calibration data and/or noise properties.

The sensor device 38 further has a measuring-data evaluation device 46 connected to the sensors via data connections, and an intermediate memory 48, which in this exemplary embodiment is formed by a part of the main memory of the measuring-data evaluation device 46, but can also be formed by at least one different memory element in other exemplary embodiments. The sensor device 38 and in particular also the measuring-data evaluation device 46, as well as the intermediate memory 48 are configured to capture and evaluate in real time the sensor signals or measuring results of the sensors.

For displaying handling data, the value-document processing apparatus 10 has a display device 50, which is realized in the example by a touch-sensitive display device ("touch screen"). The display device 50 therefore serves as input/output device of the apparatus.

The value-document processing machine has several data processing devices: a machine computer 52, a machine control device 54 for the real-time control of components of the value-document processing apparatus 10, and the measuring-data evaluation device 46 that is provided in the sensor device 38 and connected to the sensors 40, 42 and 44 via fast data connections.

The machine computer 52 serves for the overall control of the value-document processing apparatus 10, and in particular the machine control 54 and the measuring-data evaluation device 46. It is connected to the input/output device in the form of the touch-sensitive display device 50 via a signal and/or data connection, by means of which it can read control data of a user and output information to the user, in particular handling and/or operating data. Further, the machine computer 52 in this exemplary embodiment has a permanent memory 56 in the form of a mass memory, preferably a hard disk, for storing data, in particular measuring data, of the sensor device 38. The machine computer 52 is connected to the machine control device 54 and the sensor device 38, in this example the measuring-data evaluation device 46, via data connections, for example Ethernet network connections with TCP protocol. The machine computer 52 in this exemplary embodiment is an industrial PC having corresponding data interfaces, a processor 58 and a memory 60.

The measuring-data evaluation device 46 serves to process in real time the measuring data produced by means of the sensors 40, 42 and 44 and in particular to evaluate the measuring data and classify a value document employing the measuring data produced for the respective value document. Upon classifying, one of several classes is allocated to the value document for which the measuring data were captured, and a corresponding sorting signal designating the class is formed and fed to the machine control 54. As classes, for example classes for value documents recognized as authentic and fit for circulation, value documents recognized as authentic, but no longer fit for circulation, and value documents not recognized as authentic can be provided in dependence on the mode of operation of the value-document processing apparatus 10. For this purpose, the measuring-data evaluation device 46 has in particular, besides data interfaces for the sensors that are not shown in the figures, a processor 62 and a memory 64 connected to the processor 62, in which memory there is stored at least one computer program with program code, upon the execution of which the processor 62 executes the stated functions of the measuring-data evaluation device 46 in the respective mode of operation.

The sensor device 38 can be operated in at least three different modes of operation. In the working mode of operation, measuring data are captured by the sensors 40, 42 and 44 and evaluated as described by the measuring-data evaluation device. This mode of operation will not be described in greater detail hereinafter. In the measuring mode of operation, the sensors 40, 42 and 44 capture measuring data which are evaluated by the measuring-data evaluation device 46 and stored in the intermediate memory 48 as described in the following. In contrast, sensor data are not captured and evaluated in a rest mode of operation. The operation method of the sensor device 38 in these two modes of operation, in particular also further processes, will be addressed in more detail in the following.

The machine control 54 is configured to control in real time the value-document processing apparatus 10, in this exemplary embodiment in particular its feeding device 14, its transport device 18 and, in real time and at least partly in dependence on the sorting signals of the measuring-data evaluation device 46. For this purpose, the machine control 54 is connected to the measuring-data evaluation device 46 via a data connection, in this exemplary embodiment a CAN bus. The machine control 54 can so drive the gates 32 and 34 of the transport device 18, for example in dependence on the sorting signals of the measuring-data evaluation device 46, that the value document is fed to an output pocket where the value documents of the class are collected that is allocated to the respective value document. Besides data interfaces for the stated data connections, also the machine control 54 likewise—not shown in the figures—has a processor and a memory connected to the processor via a data connection, in which memory there is stored a computer program with program code, upon the execution of which by the processor the functions described above or the functions described hereinafter are executed.

For this purpose the value-document processing apparatus 10 is configured to be operated in at least two types or modes of operation, a sorting mode of operation for sorting value documents in dependence on their state and/or quality and their authenticity, and in a measuring-data capturing mode of operation for capturing measuring data for predetermined value documents. In particular the above-mentioned data processing devices are configured correspondingly for this purpose.

In the sorting mode of operation, value documents from the feeding device 14 are singled and transported past or through the sensor device 38. The sensor device 38 captures or measures physical properties of the value documents respectively transported past or through the former and forms sensor signals or measuring data that describe the measuring values for the physical properties. In dependence on the sensor signals of the sensors 40, 42 and 44 for a value document and classification parameters stored in the measuring-data evaluation device 46, the measuring-data evaluation device 46 classifies the value document into any one of the predetermined authenticity classes, emitting a corresponding sorting signal to the machine control 54. The former so drives the transport device 18, here more exactly the gates 32 and/or 34, by emitting actuating signals that the value document is output in accordance with its class ascertained upon classification to an output section of the output device 16 that is allocated to the class. The allocation to one of the predetermined authenticity classes and/or the classification here is effected in dependence on at least one predetermined authenticity criterion.

In the following, the operation in the second mode of operation of the value-document processing apparatus, in the measuring-data capturing mode of operation, will be described in more detail. Roughly outlined, predetermined value documents from the feeding device 14 are singled and transported past or through the sensor device 38. The sensor device 38 captures or measures physical properties of the value documents respectively transported past or through the former, evaluates them and, similar to the sorting mode of operation, feeds a sorting signal reproducing the evaluation result to the machine control 54, which correspondingly drives components of the value-document processing apparatus 10 under its control. Further, measuring data captured by means of the sensors, in particular in this example the raw data of the sensors, are stored. More exactly, in the memories of the three stated data processing devices, there are stored computer programs, upon the execution of which by the respective processors of the respective data processing devices the following method is carried out.

To make available measuring data for a stack of predetermined value documents, in the example thus banknotes, a user inserts the stack in the feeding device 14, here the input pocket 20. The value-document processing apparatus 10 is then started by means of the machine computer 52 and the input/output device 50 in the measuring-data capturing mode of operation.

The machine computer 52 so drives the sensor device 38 that the former is set to the measuring mode of operation. Further, the machine computer 52 so drives the machine control 54 that the former drives the feeding device 14, in particular the singler 22 and the transport device 18 in such a fashion that the value documents 12 present in the feeding device 14 are fed to the transport device 18 in a singled state by means of the singler 22, and the transport device 18 transports the singled value documents individually past or through the sensors 40, 42 and 44 of the sensor device 38.

Now a capturing stage of the method starts.

The sensors 40, 42 and 44 of the sensor device 38 now capture the physical properties that correspond to the sensors of a value document respectively transported past or through them, so as to form measuring data. The measuring data are transmitted in real time to the measuring-data evaluation device 46, which stores the measuring data in the intermediate memory 46 and evaluates them. In the intermediate memory 48 also all other data are stored that arise upon evaluation or as a result of the evaluation, which will be referred to as other operating data in the following. Upon evaluating, one of the predetermined classes is allocated to the value document and a sorting signal designating the allocated class is formed and transmitted to the machine control 54. The machine control 54 then drives the transport device 18 in dependence on the sorting signal.

In the measuring mode of operation or during the capturing of the measuring data, the measuring-data evaluation device 46 monitors a criterion that the current utilization of the intermediate memory exceeds a predetermined limit utilization. In this exemplary embodiment it monitors for this purpose whether the current utilization of the intermediate memory 48 exceeds a predetermined limit value. The limit value is so chosen in dependence on the size of the maximally available intermediate memory, the singling speed, the length of the transport path 36 up to the sensors 40, 42 and 44 and the amount of measuring data for one value document that after an interruption of the value document singling there is sufficient intermediate memory left available in order to capture measuring data for those value documents which are still transported to the sensors after the interruption. In particular, the limit value can be ascertained in such a fashion that, in dependence on the singling speed, the amount of measuring data for one value document and the maximum size of the intermediate memory and the current memory utilization, it is forecast after what period of time the intermediate memory will no longer be sufficient to store the measuring data for a further value document. In dependence on the time for the transport of a value document from the feeding device 14, more exactly the singler 22, to the sensors and the period of time, it is then checked when the singling must be interrupted in order to prevent an overflow of the intermediate memory.

When the limit value is exceeded, the measuring-data evaluation device 46 emits an interruption signal to the machine control 54, thereby requesting an interruption of the singling.

In response to the interruption signal, the machine control 46 so drives the feeding device 14, more exactly in this example the singler 22, that the singling is interrupted.

Along the section of the transport path 36 from the feeding device 14 to the sensors 40, 42 and 44, transport monitoring sensors are arranged that are not shown in the figures, by means of which the machine control 54 monitors whether there are still value documents disposed in the section of the transport path or transported therein.

When no value document is disposed in the section of the transport path any longer, the machine control 52 emits a signal to the measuring-data evaluation device 46, in response to which the former sets the sensor device 38 to the rest mode of operation, in which no measuring data are captured and written to the intermediate memory; on the other hand it emits a signal to the machine computer 52 which indicates the change from the measuring mode of operation and the rest mode of operation.

The capturing stage of the method is initially finished thereby. A transfer stage of the method follows.

In response to the signal of the measuring-data evaluation device 46, the machine computer 52 collects from the intermediate memory 48 the measuring data and other operating data stored in the intermediate memory 48, and stores them in the permanent memory 56. The intermediate memory 48 is released while doing so. When all data have been collected, the machine control 52 emits a continuation signal to the measuring-data evaluation device 46.

In response to this continuation signal, the measuring-data evaluation device 46 emits a signal to the machine control 54 on the one hand. In response to this, the machine control 54 so drives the feeding device 14, in this exemplary embodiment in particular the singler 22, and the transport device 18 that the singling of the value documents in the feeding device and the transporting of the singled value documents to the sensors 40, 42 and 44 are continued. On the other hand, the measuring-data evaluation device 46 sets the sensor device 38 to the measuring mode of operation, so that the former resumes producing measuring data for fed value documents by means of the sensors 40, 42 and 44, evaluating them and storing them in the intermediate memory 48.

The method is then continued with a new capturing stage. The mentioned stages are repeated in the described order for such a time until no value document is left in the feeding device 14 or, in other exemplary embodiments, a predetermined number of value documents has been singled.

In this fashion, measuring data are stored for the predetermined value documents of the value document stack without special interaction of a user, wherein the method requires only very little time expenditure.

The measuring data stored in the permanent memory 56 can now be employed in the value-document processing apparatus or can be employed for the adaptation of classification parameters after transmission to an eternal data processing device via a not shown data interface of the machine computer.

Figure 2:
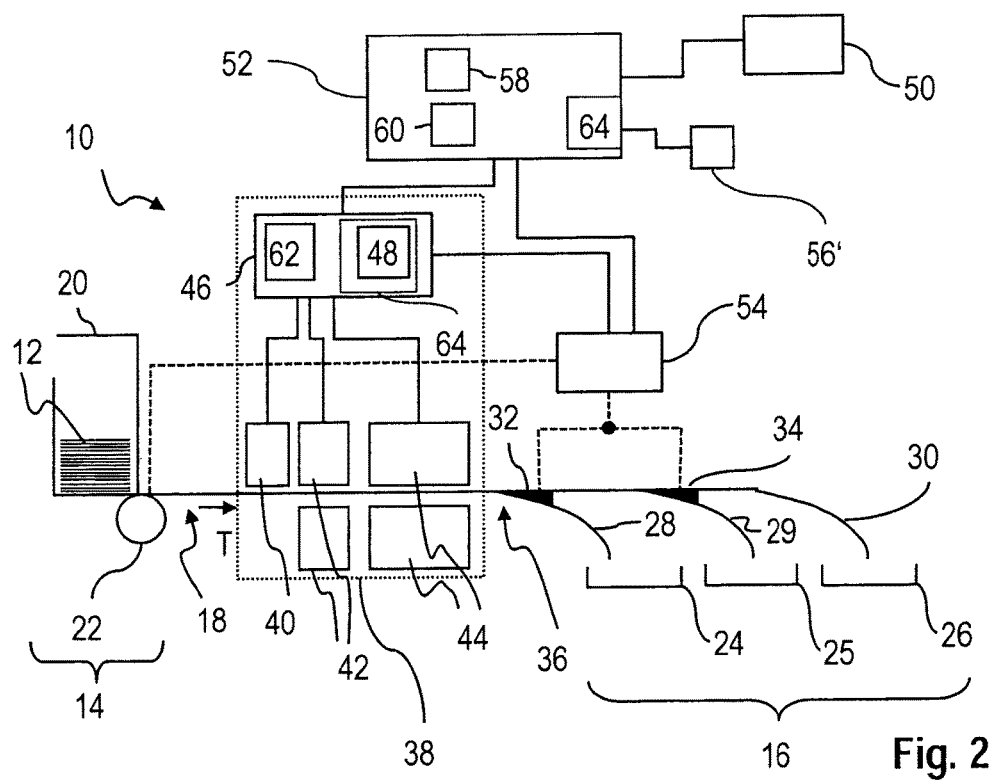
FIG. 2 a schematic view of a further value document sorting apparatus.

A further exemplary embodiment in FIG. 2 differs from the first exemplary embodiment in that the permanent memory 56 has now been replaced by an external memory 56', in the example a USB hard disk, and instead, in the example in the machine computer 52, there is provided a data interface 66, in the example a USB interface, via which the permanent memory 56 is connected. The computer program of the machine computer is now so modified that the measuring data transferred from the intermediate memory 48 are stored in the external permanent data memory via the data interface 66.

In yet other exemplary embodiments, the data interface 66 is replaced by an Ethernet interface and the external permanent memory is a network hard-disk drive (NAS—network array storage).

Yet other exemplary embodiments differ from the above-described exemplary embodiments only in that as the criterion that the current utilization of the intermediate memory exceeds a predetermined limit utilization it is monitored how many value documents have been singled and captured by the sensors after the start or restart of the feeding, and this number is compared to a predetermined maximum number. This maximum number is determined analogously to the limit utilization in the first exemplary embodiment, and is so chosen in particular that after an interruption of the singling immediately after determining that the criterion is fulfilled, there is sufficient memory left in the intermediate memory in order to store the measuring data possibly remaining to be captured for value documents that are still disposed in the transport path in front of the sensors.

The invention claimed is:

1. A method for making available measuring data of a value-document processing apparatus for processing value documents, comprising:
   a feeding device for feeding individual value documents and a sensor device with an intermediate memory, having one or several sensors for capturing at least one physical property of fed individual value documents and being configured to store in real time in the intermediate memory measuring data for the individual value documents produced by means of the one sensor or of the several sensors;
   wherein by means of the feeding device individual value documents are fed and, in real time, measuring data are captured for the value documents by means of the sensor device and stored in the intermediate memory, such that measuring data for a plurality of value documents is stored in the intermediate memory simultaneously,
   wherein during the feeding of individual value documents and/or the capturing of measuring data a criterion is monitored that the current utilization of the intermediate memory exceeds a predetermined limit utilization;
   wherein when the criterion is fulfilled, the feeding of value documents is interrupted and measuring data from the intermediate memory are permanently stored in a permanent memory; and
   wherein, during the permanent storing and/or after the permanent storing of the measuring data in the permanent memory, the intermediate memory is released again, and after the release of the intermediate memory, the feeding of individual value documents and the capturing and storing in the intermediate memory of measuring data for the fed value documents is restarted.

2. The method according to claim 1, wherein after the interruption of the feeding and before the permanent storing of the measuring data also the capturing and/or storing of measuring data is interrupted.

3. The method according to claim 2, wherein after the interruption of the feeding it is checked whether no individual value document is disposed any longer along the transport path between the feeding device and the sensor device, and the interruption of the capturing and storing of the measuring data is effected only when no fed value document is disposed any longer between the feeding device and the sensor device.

4. The method according to claim 1, wherein the permanent memory forms part of the value-document processing apparatus.

5. The method according to claim 1, wherein the value-document processing apparatus has an interface for the data transmission to the permanent memory and the permanent memory is set off from the value-document processing apparatus.

6. The method according to claim 1, wherein the predetermined limit is calculated such that sufficient intermediate memory is left available to capture measuring data for those value documents that are transported to the sensors after a processing interruption.

7. An apparatus for processing value documents, comprising:
   a feeding device for feeding individual value documents, an receiving device for receiving processed value documents, a transport device for transporting individual value documents from the feeding device along a transport path to the receiving device;
   a sensor device with an intermediate memory, having one or several sensors for capturing respectively at least one physical property of individual value documents fed and transported along the transport path, and being configured to store in real time in the intermediate memory measuring data for the value documents produced by means of the one sensor or the several sensors, wherein the sensor device can be set to a measuring mode of operation, wherein the measuring data for individual value documents are captured and stored in the intermediate memory, such that measuring data for a plurality of value documents is stored in the intermediate memory simultaneously, and a criterion is monitored that the current utilization of the intermediate memory exceeds a predetermined limit utilization, and a rest mode of operation, wherein no measuring data are stored;
   a permanent memory for permanently storing measuring data and/or an interface for an external permanent memory for permanently storing measuring data;
   wherein the apparatus is configured, when the sensor device is in the measuring mode of operation, to so drive the feeding device when the criterion is fulfilled that the feeding device does not feed any further individual value documents, to set the sensor device to the rest mode of operation and to permanently store the measuring data from the intermediate memory in the permanent memory or external permanent memory, and, during the storing or after the storing, to release the intermediate memory again, and, after the release of the intermediate memory, to so drive the feeding device that the feeding device restarts the feeding of individual value documents, and to set the sensor device to the measuring mode of operation.

8. The apparatus according to claim 7, further having a machine control for controlling the feeding device and the transport device in real time, and wherein the sensor device comprises an evaluation device that evaluates the measuring data and, in dependence on the result of the evaluation, sends control signals to the machine control, and/or wherein, for the purpose of interrupting the feeding of the value documents, the sensor device drives the machine control with an interruption signal, which machine control then drives the feeding device, so that no value documents are fed any longer.

9. The apparatus according to claim 8, wherein the machine control checks after receipt of the interruption signal whether no individual value document is disposed any longer along the transport path between the feeding device and the sensor device, and the check has had the result that no individual value document is disposed any longer along the transport path between the feeding device and the sensor device, emits a signal to the sensor device, in response to which the sensor device is set to the rest mode of operation.

* * * * *